(12) United States Patent
Aso et al.

(10) Patent No.: US 8,349,147 B2
(45) Date of Patent: Jan. 8, 2013

(54) METHOD FOR FORMING PHOTOCATALYTIC APATITE FILM

(75) Inventors: Noriyasu Aso, Kawasaki (JP); Masato Wakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 893 days.

(21) Appl. No.: 11/141,030

(22) Filed: Jun. 1, 2005

(65) Prior Publication Data

US 2005/0230241 A1    Oct. 20, 2005

Related U.S. Application Data (63) Continuation of application No. PCT/JP02/13870, filed on Dec. 27, 2002.

(51) Int. Cl.
| | |
|---|---|
| *B22F 1/00* | (2006.01) |
| *B22F 9/00* | (2006.01) |
| *C21B 15/04* | (2006.01) |
| *C22B 5/20* | (2006.01) |
| *C22C 1/04* | (2006.01) |
| *C23C 14/00* | (2006.01) |
| *C23C 14/32* | (2006.01) |

(52) U.S. Cl. ............... 204/192.26; 204/192.15; 75/370; 75/371

(58) Field of Classification Search ............... 419/13, 419/46; 428/697; 502/200; 204/192.15, 204/192.26, 298.12, 298.13; 75/370, 371
See application file for complete search history.

(56) References Cited

U.S. PATENT DOCUMENTS

| | | | | |
|---|---|---|---|---|
| 5,342,571 | A | * | 8/1994 | Dittmar et al. .................. 419/13 |
| 5,543,019 | A | * | 8/1996 | Lee et al. .................. 204/192.15 |
| 6,248,291 | B1 | * | 6/2001 | Nakagama et al. ............. 419/46 |
| 6,344,276 | B1 | * | 2/2002 | Lin et al. ........................ 428/469 |
| 6,761,984 | B2 | * | 7/2004 | Anzaki et al. ................. 428/697 |
| 6,835,688 | B2 | * | 12/2004 | Morikawa et al. ............. 502/200 |
| 2003/0039843 | A1 | * | 2/2003 | Johnson et al. ............... 428/432 |

FOREIGN PATENT DOCUMENTS

| | | | | |
|---|---|---|---|---|
| JP | 01238869 | A | * | 9/1989 |
| JP | 03039468 | A | * | 2/1991 |
| JP | 04323366 | A | * | 11/1992 |
| JP | 05310410 | A | * | 11/1993 |
| JP | 6-330285 | | | 11/1994 |
| JP | 10-72666 | | | 3/1998 |
| JP | 10-328292 | | | 12/1998 |
| JP | 2000-327315 | | | 11/2000 |
| WO | WO 0146488 | A1 | * | 6/2001 |

OTHER PUBLICATIONS

Machine Translation—JP 05310410.*

* cited by examiner

*Primary Examiner* — Jonathan Johnson
*Assistant Examiner* — Michael Band
(74) *Attorney, Agent, or Firm* — Fujitsu Patent Center (57) ABSTRACT

A method for forming a photocatalytic apatite includes a target production step (S12) for producing a sputtering target that contains photocatalytic apatite, and a sputtering step (S13) for forming a photocatalytic apatite film on a substrate by sputtering using the target. A firing step (S11) for firing the photocatalytic apatite is conducted before the sputtering step so as to increase the crystallinity of the photocatalytic apatite.

7 Claims, 6 Drawing Sheets

$$—Ca—P—P—Ca—P—P—Ti—P—$$

with H-O groups attached above each Ca, P, P, Ca, P, P, Ti, P atom.

METHOD FOR FORMING PHOTOCATALYTIC APATITE FILM

This application is a continuing application, filed under 35 U.S.C. §111(a), of International Application PCT/JP2002/13870, filed Dec. 27, 2002, incorporated by reference herein.

TECHNICAL FIELD

The present invention relates to a method for forming a film having a photocatalytic function. More particularly, the present invention relates to a method for forming a photocatalytic apatite film, in which sputtering is employed as the film formation method.

BACKGROUND ART

As laptop computers, cellular telephones, and other such electronic devices are handled, they can become soiled with oil from the hands of the user or with cigarette tar, and dust and so forth can adhere via these substances. Also, when oil from the hands adheres to an electronic device, it tends to foster the proliferation of germs and the like on the surface of the device. Furthermore, if sebum, cigarette tar, germs, and the like are not removed, they can adversely affect the appearance of electronic devices, which in turns makes the devices look dirty. With laptop computers, cellular telephones, and other electronic devices, the need to avoid this is particularly great for the housing and the transparent cover used to protect the display screen. In addition, the growing concern over microbes in our living environments has led to the requirement that the housings, control keys, and so forth of laptop computers, cellular telephones, and other electronic devices be antimicrobial. Because of this, there has been a need in the field of electronic devices for some antimicrobial/anti-soiling technology for dealing with the problems caused by sebum, cigarette tar, germs, and so forth.

The photocatalytic function of certain semiconductor substances such as titanium oxide ($TiO_2$) has come under scrutiny in recent years, and it is known that an antimicrobial action, anti-soiling action, and so on can result from this photocatalytic function. Photocatalytic semiconductor substances generally absorb light having energy corresponding to the band gap between the valence band and the conductor band, causing electrons from the valence band to make a transition to the conduction band, and this electron transition produces holes in the valence band. Electrons in the valence band have the property of moving to substances adsorbed to the surface of the photocatalytic semiconductor, and this can result in the chemical reduction of the adsorbed substances. Holes in the valence band have the property of stripping electrons from a substance adhering to the surface of the photocatalytic semiconductor, and this can result in the oxidation of the adsorbed substances.

With photocatalytic titanium oxide ($TiO_2$), electrons that have made the transition to the conduction band reduce the oxygen in the air, producing a superoxide anion ($.O_2^-$) Along with this, the holes produced in the valence band oxidize adsorbed water on the surface of the titanium oxide, producing hydroxy radicals ($.OH$). Hydroxy radicals are extremely oxidative. Accordingly, when an organic compound, for instance, is adsorbed to photocatalytic titanium oxide, it may be decomposed into water and carbon dioxide by the action of the hydroxy radicals. Because it is capable of promoting such oxidative decomposition reactions in organic substances on the basis of its photocatalytic function, titanium oxide is widely used in antibacterial agents, disinfectants, antifouling agents, deodorants, environmental cleaning agents, and so forth.

Titanium oxide ($TiO_2$) is colorless. Therefore, this colorless titanium oxide is sometimes formed into a thin layer by sputtering on the surface of a certain object for the purpose of imparting antimicrobial activity, for example, without affecting the member aesthetically. When formed in a thin layer by sputtering, a titanium oxide film is itself substantially transparent.

However, when a titanium oxide thin film is formed on a glass surface, an interference fringe is often produced when the light rays transmitted through the titanium oxide thin film and the glass interfere with each other, resulting in a loss of transparency in the glass. This is because the refractive index of titanium oxide is about three times that of glass. It is possible to reduce the occurrence of this interference fringe by making the titanium oxide film thinner, but the thinner the film, the less antimicrobial activity had by the titanium oxide film. If the titanium oxide film becomes too thin, sufficient antimicrobial activity may not be obtained on a glass surface.

Also, titanium oxide itself does not adsorb substances well to its surface. Therefore, to obtain sufficient photocatalytic function (oxidative decomposition action), and in turn, antimicrobial action, anti-soiling action, and so forth, in titanium oxide on the basis of its photocatalytic function, it is necessary to increase the contact efficiency between the titanium oxide and the material that is to be oxidatively decomposed.

A technique for increasing the contact efficiency between titanium oxide and a material that is to be decomposed has been disclosed in JP-A No. 2000-327315, for example. This publication discloses a photocatalytic apatite produced by compounding on the atomic level of, for example, titanium oxide (which has a photocatalytic function) and calcium hydroxyapatite (CaHAP) (which is particularly good at adsorbing proteins and other organic substances). In specific terms, this photocatalytic apatite is titanium-modified calcium hydroxyapatite (Ti—CaHAP) having a crystal structure in which part of the calcium that makes up the CaHAP ($Ca_{10}(PO_4)_6(OH)_2$) has been substituted with titanium. A titanium oxide-like partial structure resembling the chemical structure of photocatalytic titanium dioxide is formed at the site where the titanium is introduced. Because a titanium oxide-like partial structure capable of exhibiting a photocatalytic function is present in the crystal structure of the CaHAP, which adsorbs organic substances so well, the contact efficiency between the organic substance (the material to be decomposed) and the titanium oxide-like partial structure is effectively increased. Therefore, this titanium oxide-like partial structure is able to efficiently oxidize and decompose organic substances such as oil from the hands or bacterial cell membranes through its photocatalytic function.

According to JP-A No. 2000-327315, the photocatalytic apatite is obtained in the form of a powder. A thin film of photocatalytic apatite can be formed on a specific substrate by sputtering, using a sputtering target made from this photocatalytic apatite powder. Techniques for forming a film of apatite material by sputtering are disclosed, for example, in JP-A No. 10-72666 and JP-A No. 10-328292. Ti—CaHAP, which is an example of photocatalytic apatite, is colorless and has a refractive index comparable to that of glass. Accordingly, when a Ti—CaHAP is formed by sputtering on a glass surface, substantially no interference fringe is produced because there is almost no interference in the light transmitted through the Ti—CaHAP film and the glass. Thus, with photocatalytic apatite applied to a glass surface by sputtering, it is sometimes possible to preserve good transparency in the glass without having to reduce the film thickness excessively.

Nevertheless, it is known that with prior art, the photocatalytic activity of a sputtered photocatalytic apatite film is decreased considerably compared to that of the photocatalytic apatite prior to film formation. The first step in sputtering is to accelerate the inert gas ions serving as the sputtering gas, so that these ions collide with a target made from the substance to be made into a thin film. This causes the substance to be scattered from the target surface. The scattered substance is deposited on a substrate disposed across from the target, and as a result a thin film is formed on the substrate. When a conventional photocatalytic apatite film formation technique employing sputtering is used to form a film, it is surmised that in the course of the scattering of the photocatalytic apatite from the target, the crystal structure of the apatite is destroyed to the extent that there is an excessive decrease in the photocatalytic function thereof. Therefore, up to now it has been impractical to employ sputtering as the film formation method in the formation of a photocatalytic apatite film exhibiting a photocatalytic function.

DISCLOSURE OF THE INVENTION

It is an object of the present invention to provide a method for forming a photocatalytic apatite film that has high photocatalytic activity and excellent transparency.

A first aspect of the present invention provides a method for forming a photocatalytic apatite film. This method comprises a target production step for producing a sputtering target that contains photocatalytic apatite, and a sputtering step for forming a photocatalytic apatite film on a substrate by sputtering using said target, and a firing step for firing the photocatalytic apatite is conducted before the sputtering step so as to increase the crystallinity of the photocatalytic apatite.

A photocatalytic apatite film formed by this method has high photocatalytic activity. In the first aspect of the present invention, sputtering is performed as the method for forming a photocatalytic apatite film, and the photocatalytic apatite subjected to this sputtering is fired so that its crystallinity increases, prior to the sputtering step. This firing step is carried out before the target production step, during the target production step, or after the target production step. The inventors found that the photocatalytic activity of photocatalytic apatite can be maintained at a suitable level, even through a sputtering step, by performing the firing step before the photocatalytic apatite is subjected to sputtering.

With a conventional method for forming a photocatalytic apatite film, it is surmised that when apatite is scattered from a photocatalytic apatite target with which ionized sputtering gas collides at a specific energy, this apatite is in a state in which its crystal structure has been so severely damaged that sufficient photocatalytic activity cannot be maintained, that is, in a state of atoms or relatively small clusters. In contrast, with the method for forming a photocatalytic apatite film pertaining to the first aspect of the present invention, it is surmised that when apatite is scattered from a photocatalytic apatite target whose crystallinity has been increased in the firing step during film formation by sputtering, this apatite is in a state of relatively large clusters that maintain their chemical structure enough to exhibit photocatalytic activity. A photocatalytic apatite film having high photocatalytic activity is formed by depositing on a substrate clusters that maintain their chemical structure enough to exhibit photocatalytic activity.

A photocatalytic apatite film formed by the method pertaining to the first aspect of the present invention also has excellent transparency. With the present invention, the photocatalytic apatite film itself can be formed substantially transparent because colorless photocatalytic apatite is formed in a thin film by sputtering.

In addition, the refractive index of photocatalytic apatite having an apatite crystal structure is sometimes about the same as that of transparent glass. With the method pertaining to the first aspect, when a photocatalytic apatite film having a refractive index about the same as that of transparent glass is formed on glass, there is none of the interference fringe that was produced when a titanium oxide film was formed on glass.

Thus, a photocatalytic apatite film formed by the method pertaining to the first aspect of the present invention has high photocatalytic activity and excellent transparency. Therefore, when a photocatalytic apatite film such as this is formed on the surface of an electronic device housing, for instance, this housing will have excellent antimicrobial properties, anti-soiling properties, and so forth, without being adversely affected aesthetically. Also, when a photocatalytic apatite film such as this is formed on the surface of a transparent cover used to protect the display of an electronic device, for instance, this cover will have excellent antimicrobial properties, anti-soiling properties, and so forth, without being adversely affected aesthetically.

In the first aspect of the present invention, the firing step is preferably performed on powdered photocatalytic apatite before the target production step. Alternatively, in the target production step, a sintering treatment is preferably performed on the photocatalytic apatite, and this sintering treatment includes a firing step. The firing step and the target production step both involved heat treatment of the photocatalytic apatite. The heating temperature and heating duration in this heat treatment are determined as follows: Whether the firing step is performed before the target production step, or during the target production step, or after the target production step is selected according to the conditions necessary for increasing the crystallinity of the photocatalytic apatite in the firing step, and the conditions necessary for producing a photocatalytic apatite target in the target production step.

The first aspect of the present invention preferably further comprises an additional firing step for firing the photocatalytic apatite film formed on the substrate after the sputtering step so as to increase the crystallinity of the photocatalytic apatite. In this additional firing step, the photocatalytic apatite is preferably fired at 550° C. or higher. Performing the specified firing step after the sputtering step tends to increase the photocatalytic activity of the photocatalytic apatite film.

A second aspect of the present invention provides another method for forming a photocatalytic apatite film. This method comprises a target production step for producing a sputtering target that contains photocatalytic apatite, a sputtering step for forming a photocatalytic apatite film on a substrate by sputtering using said target, and a firing step for firing the photocatalytic apatite film formed on the substrate so as to increase the crystallinity of the photocatalytic apatite.

With the second aspect of the present invention, sputtering is performed as the method for forming a photocatalytic apatite film, and the photocatalytic apatite film formed in this sputtering step is fired so as to increase its crystallinity. Therefore, a photocatalytic apatite film formed by the method pertaining to the second aspect has high photocatalytic activity. A photocatalytic apatite film formed by the method pertaining to the second aspect of the present invention also has excellent transparency, just as with the photocatalytic apatite formed by the method pertaining to the first aspect. Therefore, the second aspect of the present invention has the same effects as those described above for the first aspect.

In the first and second aspects of the present invention, the photocatalytic apatite is preferably fired at 550° C. or higher in the firing step. The increase in the crystallinity of the photocatalytic apatite tends to be pronounced when the firing temperature is at least 550° C.

Preferably, the photocatalytic apatite is sintered at 100 to 500° C. in the target production step. Such sintering allows a good photocatalytic apatite target to be produced.

Preferably, a photocatalytic apatite film is formed at a gas pressure of 0.27 to 3 Pa and a substrate temperature of at least 100° C. in the sputtering step. Preferably, argon gas is used as the sputtering gas in the sputtering step. Using these sputtering conditions makes it possible to form a photocatalytic apatite film of the specified thickness at a significant rate.

Preferably, the photocatalytic apatite is titanium-modified calcium hydroxyapatite (Ti—CaHAP) having a crystal structure in which part of the calcium of the calcium hydroxyapatite has been substituted with titanium.

Since this Ti—CaHAP is the product of compounding on the atomic level of titanium oxide (which has a photocatalytic function) and calcium hydroxyapatite (CaHAP) (which is particularly good at adsorbing proteins and other organic substances), there is a synergistic effect in the photocatalytic activity originating in the titanium and the good adsorptivity originating in the CaHAP, allowing this Ti—CaHAP to function as an excellent photocatalytic substance as discussed above.

Preferably, the proportion of titanium in the combined calcium and titanium in the titanium-modified calcium hydroxyapatite is from 3 to 11 mol %. This proportion is favorable in terms of achieving excellent photocatalytic activity.

BEST MODE FOR CARRYING OUT THE INVENTION

The present invention is a method for forming a photocatalytic apatite film, in which sputtering is employed as the film formation method. The photocatalytic apatite that is formed into a film in the present invention is produced by compounding on the atomic level of a photocatalytic metal oxide and what is known as apatite. The apatite that makes up the basic skeleton of the photocatalytic apatite can be expressed by the following general formula.

(1).

In Formula 1, A is a metal atom such as Ca, Co, Ni, Cu, Al, La, Cr, or Mg. B is an atom such as P or S. X is a hydroxyl group (—OH), a halogen atom (such as F or Cl), or the like. More specifically, examples of the apatite that makes up the basic skeleton of the photocatalytic apatite include hydroxyapatite, fluoroapatite, and chloroapatite. An apatite that can be used to advantage in the present invention is hydroxyapatite in which X in the above formula has been replaced with a hydroxyl group (—OH). Preferably, this compound is calcium hydroxyapatite (CaHAP) in which A in the above formula is calcium (Ca), B is phosphorus (P), and X is a hydroxyl group (—OH). That is, $Ca_{10}(PO_4)_6(OH)_2$.

CaHAP readily undergoes ion exchange with either cations or anions, and therefore has excellent adsorptivity, so it is particularly good at adsorbing proteins and other organic substances. In addition, CaHAP powerfully adsorbs mold, bacteria, and the like, and is therefore known to be capable of inhibiting or suppressing the proliferation of these microbes.

Examples of the photocatalytic metal atoms contained in the photocatalytic apatite, that is, of the metal atoms capable of functioning as the photocatalyst center in an oxide state, include titanium, zinc, tungsten, manganese, tin, indium, and iron. These photocatalytic metal atoms are taken into the apatite crystal structure as part of the metal atoms A constituting the crystal structure of the apatite expressed by the above general formula, forming in apatite crystal structure a photocatalytic partial structure capable of exhibiting a photocatalytic function. More specifically, a "photocatalytic partial structure" can be thought of as corresponding to the structure of a photocatalytic metal oxide composed of photocatalytic metal atoms incorporated in place of part of the A atoms in Formula 1, and the oxygen atoms in Formula 1.

Figure 1:
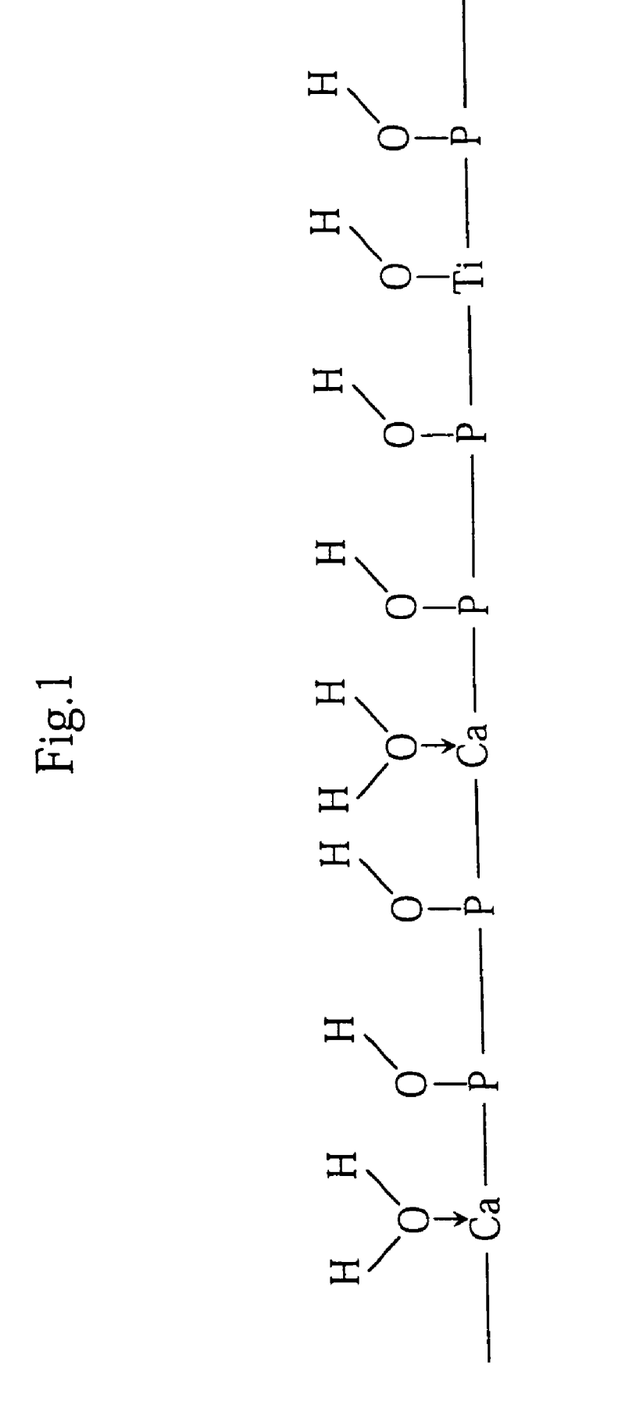
FIG. 1 is a model of the surface chemical structure of the photocatalytic apatite used in the present invention.

FIG. 1 is a model of the surface chemical structure of Ti—CaHAP, where titanium is selected as the photocatalytic metal and calcium hydroxyapatite is selected as the apatite.

With ideal Ti—CaHAP having high crystallinity, the titanium is incorporated as shown in FIG. 1, forming photocatalytic partial structures in which titanium serves as the active center in CaHAP crystal structures. With Ti—CaHAP such as this, photocatalytic partial structures (that is, catalyst sites) and adsorption sites with high adsorptivity with respect to the specific organic substances to be decomposed (not shown) are scattered around on an atomic scale in the same crystal plane. Therefore, Ti—CaHAP has both high adsorptivity and a photocatalytic function, and can efficiently exhibit an antimicrobial action, anti-soiling action, and so forth.

More specifically, under optical irradiation conditions, hydroxy radicals (.OH) are produced from adsorbed water at the titanium oxide-like catalyst sites in the Ti—CaHAP, just as with titanium oxide, and organic matter is adsorbed at the adsorption sites. The adsorbed organic matter moves by surface diffusion to the Ti—CaHAP surface, and is oxidatively decomposed by the hydroxy radicals at or near the catalyst sites. When microbes are powerfully adsorbed by the adsorption sites of the Ti—CaHAP, the proliferation of these microbes is inhibited or suppressed, so the Ti—CaHAP has an antimicrobial action even when the catalyst sites do not function as a photocatalyst because the Ti—CaHAP is not under optical irradiation conditions.

From the standpoint of effectively increasing both the adsorptivity and the photocatalytic function of the photocatalytic apatite, the proportion of the photocatalytic metal with respect to all the metal atoms contained in the apatite crystal structure of the photocatalytic apatite used in the present invention is preferably between 3 and 11 mol %. Specifically, with Ti—CaHAP, for instance, the value of Ti/(Ti+Ca) is preferably from 0.03 to 0.11 (molar ratio). The crystal structure may be disturbed if this proportion is over 11 mol %. If the proportion is under 3 mol %, however, treatment will be insufficient at catalytic sites where there is little substance adsorbed to excess adsorption sites, and the catalyst effect may not be sufficiently exhibited under optical irradiation conditions.

Figure 2:
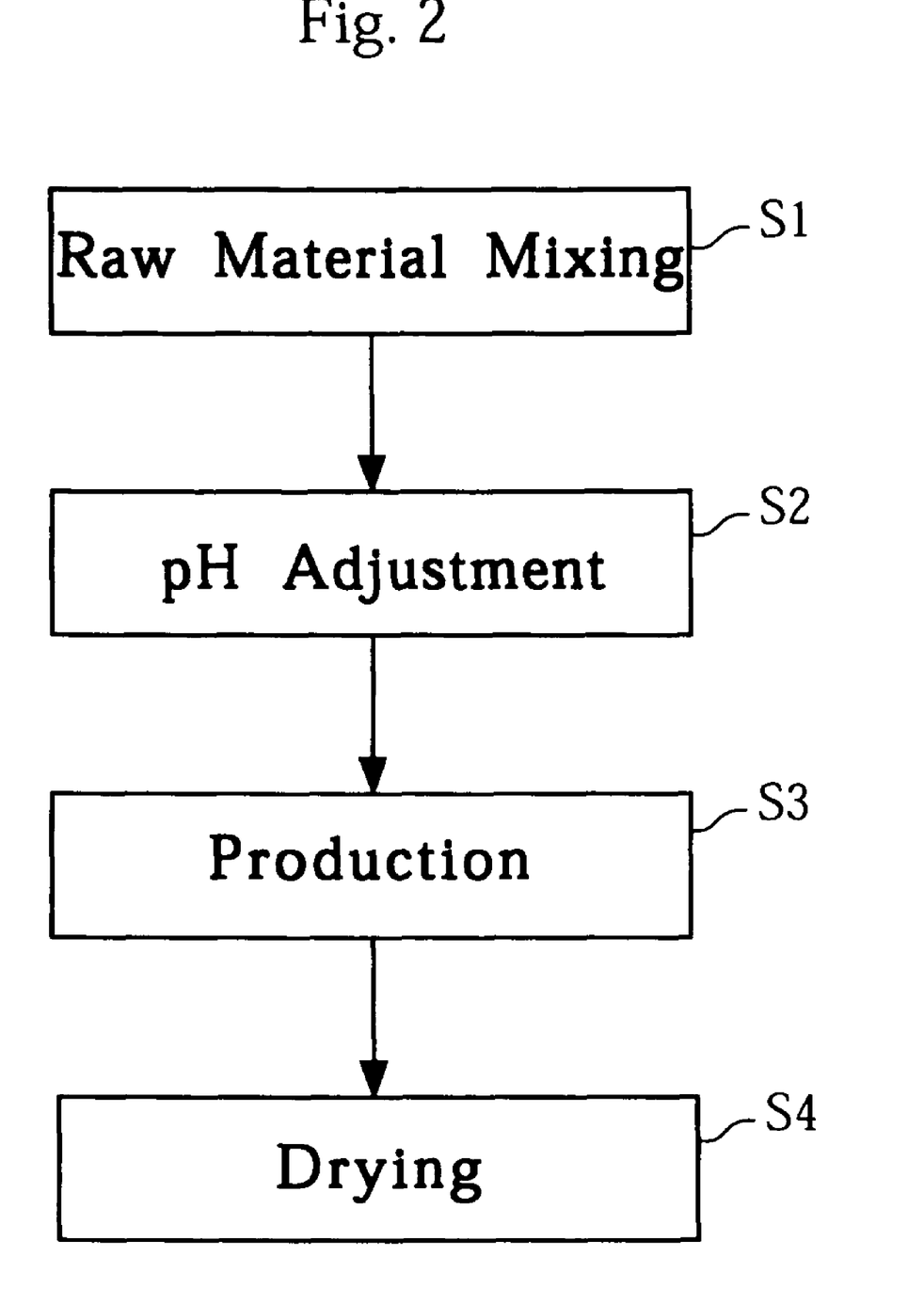
FIG. 2 is a flowchart of the method for manufacturing photocatalytic apatite used in the present invention.

FIG. 2 is a flowchart of the manufacture of the photocatalytic apatite used in the method for forming a photocatalytic apatite film pertaining to the present invention. First, the raw materials that make up the photocatalytic apatite are mixed in the raw material mixing step S1. For example, chemical species corresponding to A, $BO_y$, X, and the photocatalytic metal ions in the above-mentioned apatite general formula are added to and mixed in their specific respective amounts for a single aqueous solution system. When Ti—CaHAP is formed as the photocatalytic apatite, calcium nitrate or the like can be used as the calcium supplier. Phosphoric acid or the like can be used a the $PO_4$ supplier. Hydroxyl groups can be supplied from the alkali aqueous solution, such as an ammonia aqueous solution, potassium hydroxide aqueous solution, or sodium hydroxide aqueous solution, used in the pH adjustment discussed below. Titanium chloride or titanium sulfate can be used as the supplier of titanium serving as the photocatalytic metal.

As discussed above, the proportion of the photocatalytic metal in all the metal atoms contained in the apatite crystal structure is preferably between 3 and 11 mol %. Therefore, in the raw material mixing step S1, the amounts in which the various raw materials are supplied are preferably determined, and the relative mass amounts to be supplied are adjusted, so that the proportion of the photocatalytic metal in the photocatalytic apatite that is formed will be from 3 to 11 mol %.

Next, in the pH adjustment step S2, the pH at which the reaction producing the desired photocatalytic apatite begins is adjusted for the raw material solution readied as above. An ammonia aqueous solution, potassium hydroxide aqueous solution, sodium hydroxide aqueous solution, or the like can be used for this pH adjustment. When Ti—CaHAP is formed as the photocatalytic apatite, for example, the pH of the raw material solution is preferably adjusted to within a range of 8 to 10.

Next, in the production step S3, the crystallinity of the desired photocatalytic apatite is increased by promoting the production of the photocatalytic apatite. More specifically, for example, a raw material solution produced by the co-precipitation of part of the photocatalytic metal and the apatite component is aged for 6 hours at 100° C., which gives a photocatalytic apatite with high crystallinity. For instance, when manufacturing Ti—CaHAP, the titanium ions are incorporated in this step at the calcium positions in the apatite crystal structure during co-precipitation, and Ti—CaHAP is grown.

Next, in the drying step S4, the photocatalytic apatite produced in the previous step is dried. More specifically, first, the photocatalytic apatite powder precipitated in the production step S3 is filtered, and the filtered precipitate is then washed with pure water, after which this precipitate is dried. The drying temperature is preferably from 100 to 200° C. The result of this step is that the liquid component in the raw material solution is removed from the photocatalytic apatite. The photocatalytic apatite used in the present invention can be manufactured in this manner.

Figure 3:
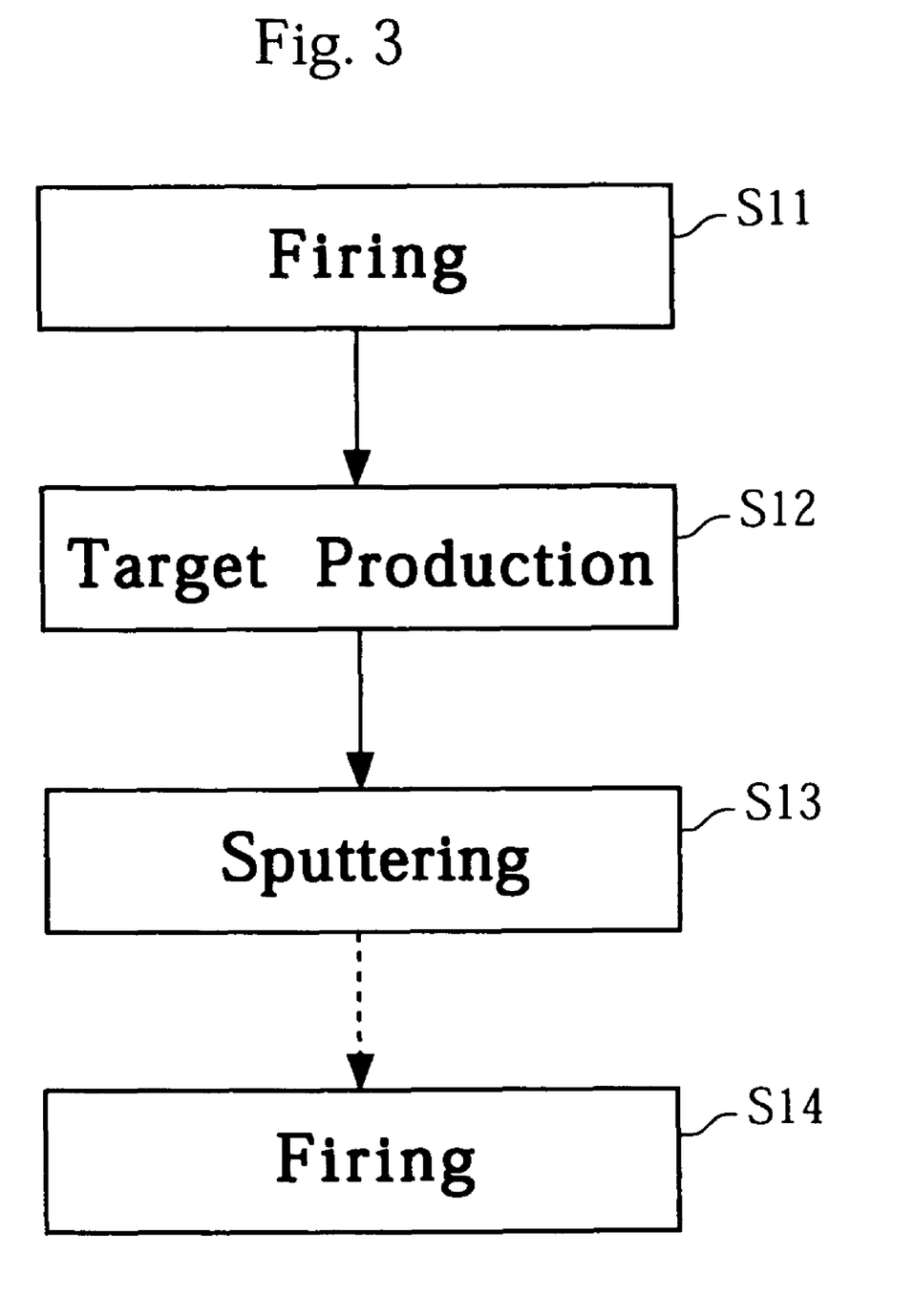
FIG. 3 is a flowchart of the method for manufacturing photocatalytic apatite pertaining to a first embodiment of the present invention.

FIG. 3 is a flowchart of the method for forming the photocatalytic apatite film pertaining to a first embodiment of the present invention. With the photocatalytic apatite film forming method pertaining to the first embodiment, first, in the firing step S11, for example, the powdered photocatalytic apatite manufactured as above is fired so as to increase its crystallinity. In this firing, the heating temperature is from 500 to 900° C., and the heating duration is from 30 minutes to 2 hours.

This step raises the crystallinity of the powdered photocatalytic apatite. How much the crystallinity is increased can be adjusted by varying the heating temperature and duration.

Next, a sputtering target is produced in the target production step S12. More specifically, the photocatalytic apatite powder produced in the firing step S11 above is compacted and sintered to produce a target. In this step, the heating temperature is from 100 to 500° C., and the heating duration is from 30 minutes to 2 hours.

Next, a photocatalytic apatite film is formed in the sputtering step S13. More specifically, the photocatalytic apatite target obtained in the target production step S12 above is used in sputtering, which forms a photocatalytic apatite film on a specific substrate. This step is performed using an RF magnetron sputtering apparatus, for example. In this sputtering, argon gas is used as the sputtering gas, the gas pressure inside the chamber is set between 0.27 and 3.0 Pa, the temperature of the substrate is set between 100 and 180° C., and the RF output is set between 100 and 300 W. This allows a photocatalytic apatite film having a photocatalytic function to be formed on the substrate.

In this step, it is surmised that when photocatalytic apatite is scattered from a photocatalytic apatite target whose crystallinity has been increased in the firing step S11, this photocatalytic apatite is in a state of relatively large clusters that maintain their chemical structure enough to exhibit photocatalytic activity. A photocatalytic apatite film that retains high photocatalytic activity is formed by depositing on a substrate clusters that maintain their chemical structure enough to exhibit photocatalytic activity.

Also, in this step, the photocatalytic apatite film itself can be formed substantially transparent because colorless photocatalytic apatite is formed in a thin film by sputtering. From the standpoint of transparency, the thickness of the photocatalytic apatite film is preferably between 0.2 and 0.4 μm.

In addition, when Ti—CaHAP having a refractive index about the same as that of glass is used for the photocatalytic apatite, and transparent glass is employed as the substrate, for example, the interference fringe that can occur when a titanium oxide film having a refractive index about three times that of transparent glass is formed on glass does not occur with a laminate structure consisting of Ti—CaHAP and transparent glass.

The photocatalytic apatite film formed by the above series of steps is sent if needed to the firing step S14. In the firing step S14, the photocatalytic apatite film formed on the substrate is fired again so as to increase its crystallinity. In this firing, the heating temperature is from 500 to 900° C., and the heating duration is from 30 minutes to 2 hours.

In some cases this step allows the crystallinity of the photocatalytic apatite constituting the film to be further increased. Increasing the crystallinity increases the photocatalytic activity of the photocatalytic apatite film. How much the crystallinity is increased can be adjusted by varying the heating temperature and duration.

Figure 4:
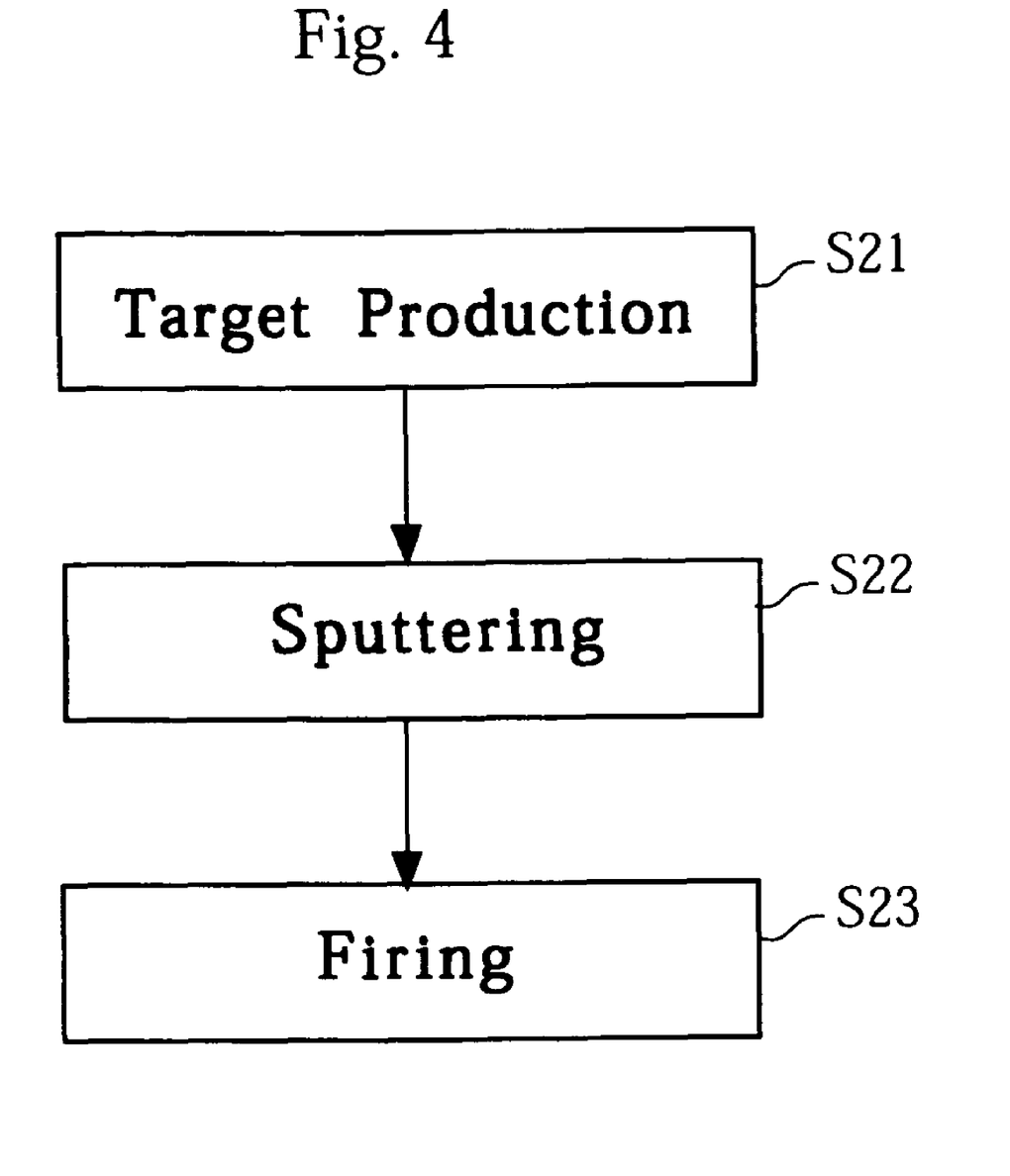
FIG. 4 is a flowchart of the method for manufacturing photocatalytic apatite pertaining to a second embodiment of the present invention.

FIG. 4 is a flowchart of the method for manufacturing photocatalytic apatite pertaining to a second embodiment of the present invention. With the photocatalytic apatite film forming method pertaining to the second embodiment, first, a sputtering target is produced in the target production step S21. More specifically, a photocatalytic apatite powder manufactured as discussed above, for example, is compacted and sintered to produce a target. In this step, the heating temperature is from 100 to 500° C., and the heating duration is from 30 minutes to 2 hours.

Next, a photocatalytic apatite film is formed in the sputtering step S22. More specifically, the photocatalytic apatite target obtained in the target production step S21 above is used in sputtering, which forms a photocatalytic apatite film on a specific substrate. The apparatus used here and the sputtering conditions are the same as those given above for the first embodiment.

In this step, it is surmised that when apatite is scattered from photocatalytic apatite that has not undergone a firing treatment, this apatite is in a state in which its crystal structure has been so severely damaged that sufficient photocatalytic activity cannot be maintained. This embodiment confirms that there is a considerable decrease in the photocatalytic activity of photocatalytic apatite that goes through this step.

Also, as discussed above for the first embodiment, in this step, the photocatalytic apatite film itself can be formed substantially transparent by forming a thin film of colorless photocatalytic apatite by sputtering.

In addition, as discussed above for the first embodiment, when Ti—CaHAP is used for the photocatalytic apatite, and transparent glass is employed as the substrate, no interference fringe occurs with a laminate structure consisting of Ti—CaHAP and transparent glass.

Next, the photocatalytic apatite film formed on the substrate is fired in the firing step S23 so as to increase its crystallinity. In this firing, the heating temperature is from 500 to 900° C., and the heating duration is from 30 minutes to 2 hours.

Performing this step increases the crystallinity of the photocatalytic apatite constituting the film. Increasing the crystallinity increases the photocatalytic activity of the photocatalytic apatite film. How much the crystallinity is increased can be adjusted by varying the heating temperature and duration.

As discussed above, the photocatalytic apatite film formed by the method pertaining to the present invention has high photocatalytic activity and excellent transparency. Therefore, if such a photocatalytic apatite film is formed on the surface of an electronic device housing, for instance, the housing can be imparted with excellent antimicrobial properties, anti-soiling properties, and so forth, without being adversely affected aesthetically. Also, when a photocatalytic apatite film such as this is formed on the surface of a transparent cover used to protect the display of an electronic device, for instance, this cover will have excellent antimicrobial properties, anti-soiling properties, and so forth, without being adversely affected aesthetically.

Example 1

Formation of Photocatalytic Apatite Film

A Ti—CaHAP powder (titanium proportion: 10 mol %; used as the photocatalytic apatite) manufactured by the steps shown in FIG. 2 was first fired for 1 hour at 600° C. in a muffle furnace. This Ti—CaHAP powder was then compacted and sintered at 200° C. to produce a sputtering target (3.5 inches in diameter, 5 mm thick). This target was then used to form a film of Ti—CaHAP over substantially one entire side of a glass sheet (100 mm×100 mm×1 mm, Pyrex glass made by Corning) by sputtering using an RF magnetron sputtering apparatus (trade name CFS-4EP-LL, made by Shibaura Mechatronics). In this sputtering, argon gas was used as the sputtering gas, the gas pressure inside the chamber was 0.67 Pa, the temperature of the substrate was 200° C., and the RF output was 200 W. This sputtering step formed a Ti—CaHAP film with a thickness of 1000 Å over the glass sheet. Next, this Ti—CaHAP-coated glass sheet was fired again for 1 hour at 600° C. in a muffle furnace. This formed the photocatalytic apatite film of this example.

<Measurement of Photocatalytic Activity>

The photocatalytic activity of the photocatalytic apatite film formed above was examined. More specifically, first the glass sheet on which the photocatalytic apatite film had been formed as above was placed inside a sealed desiccator such that the photocatalytic apatite film was exposed. Next, acetaldehyde ($CH_3CHO$) was introduced into this desiccator until the vapor phase concentration reached approximately 4000 ppm. After the introduction of acetaldehyde, the desiccator was left to stand for one hour. This resulted in a state of adsorption equilibrium of the acetaldehyde in the desiccator. After this, the entire photocatalytic apatite film was continuously irradiated with UV rays (10 mW) from the top part of the desiccator. The gas in the desiccator was sample upon completion of the introduction of the acetaldehyde and at regular intervals after this completion, and the concentration of the various gas components contained in the sample gas was measured by gas chromatography. The sampling was performed once every hour up to 4 hours after the completion of acetaldehyde introduction. The photocatalytic apatite film in this example was composed of Ti—CaHAP, and Ti—CaHAP is known to be a photocatalyst of the decomposition of acetaldehyde into carbon dioxide and water. Therefore, the concentration of carbon dioxide and acetaldehyde in the desiccator varies when the photocatalytic apatite film of this example has a photocatalytic activity such as this.

Figure 5:
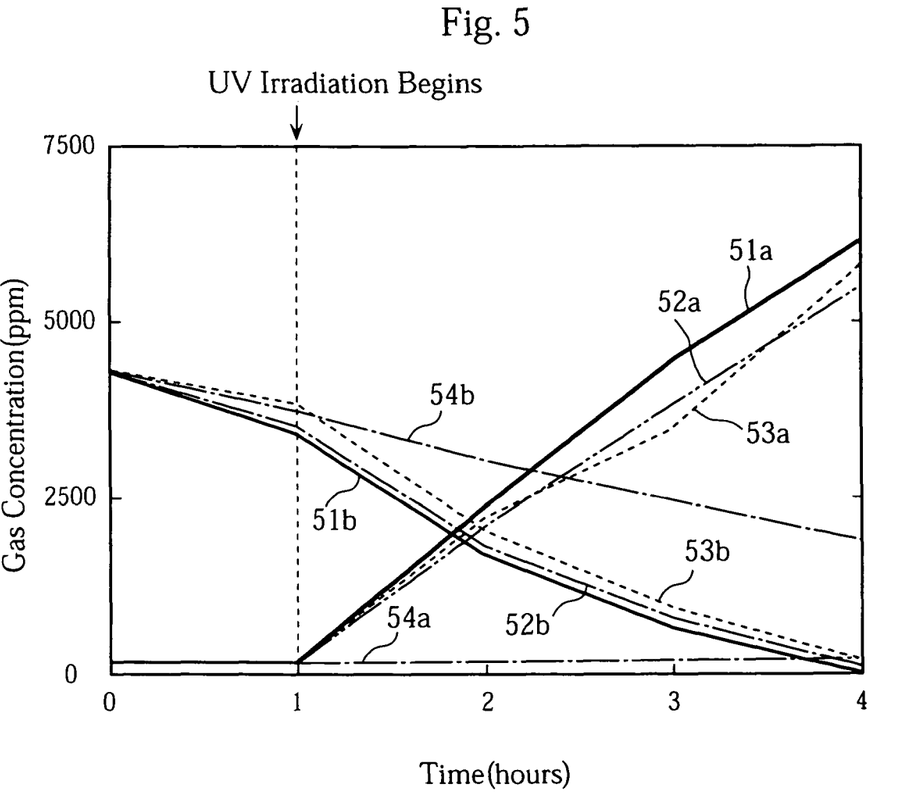
FIG. 5 is a graph of the results of measuring activity in Examples 1 to 3 and comparative examples.

FIG. 5 is a graph of the change in carbon dioxide and acetaldehyde concentration in this example. In the graph of FIG. 5, the vertical axis is the concentration of acetaldehyde remaining in the desiccator and of the carbon dioxide generated by the decomposition of this acetaldehyde, while the horizontal axis is elapsed time. In FIG. 5, line 51a is the change over time in the carbon dioxide concentration in this example, and line 51b is the change over time in the acetaldehyde concentration in this example.

Example 2

Other than not firing the Ti—CaHAP film on the glass sheet after the sputtering step, the photocatalytic apatite film of this example was formed in the same manner as in Example 1.

The photocatalytic activity of the photocatalytic apatite film of this example was measured in the same manner as in Example 1. These results are shown in the graph of FIG. 5. In FIG. 5, line 52a is the change over time in the carbon dioxide concentration in this example, and line 52b is the change over time in the acetaldehyde concentration in this example.

Example 3

A Ti—CaHAP powder (titanium proportion: 10 mol %; used as the photocatalytic apatite) manufactured by the steps shown in FIG. 2 was compacted and sintered at 200° C. to produce a sputtering target (3.5 inches in diameter, 5 mm thick). Thereafter, the photocatalytic apatite film of this example was formed by sputtering and then firing in the same manner as in Example 1.

The photocatalytic activity of the photocatalytic apatite film of this example was measured in the same manner as in Example 1. These results are shown in the graph of FIG. 5. In FIG. 5, line 53a is the change over time in the carbon dioxide concentration in this example, and line 53b is the change over time in the acetaldehyde concentration in this example.

Example 4

Formation of Photocatalytic Apatite Film

A Ti—CaHAP powder (titanium proportion: 10 mol %; used as the photocatalytic apatite) manufactured by the steps shown in FIG. 2 was compacted and sintered at 200° C. to produce a sputtering target (3.5 inches in diameter, 5 mm thick). This target was then used to form a film of Ti—CaHAP over a glass sheet (100 mm×100 mm×1 mm, Pyrex glass made by Corning) by sputtering using an RF magnetron sputtering apparatus (trade name CFS-4EP-LL, made by Shibaura Mechatronics). In this sputtering, argon gas was used as the sputtering gas, the gas pressure inside the chamber was 0.67 Pa, the temperature of the substrate was 200° C., and the RF output was 200 W. This sputtering step formed a Ti—CaHAP film with a thickness of 1000 Å over the glass sheet. Next, this Ti—CaHAP-coated glass sheet was fired for 1 hour at 500° C. in a muffle furnace. This formed the photocatalytic apatite film of this example.

<Measurement of Photocatalytic Activity>

Figure 6:
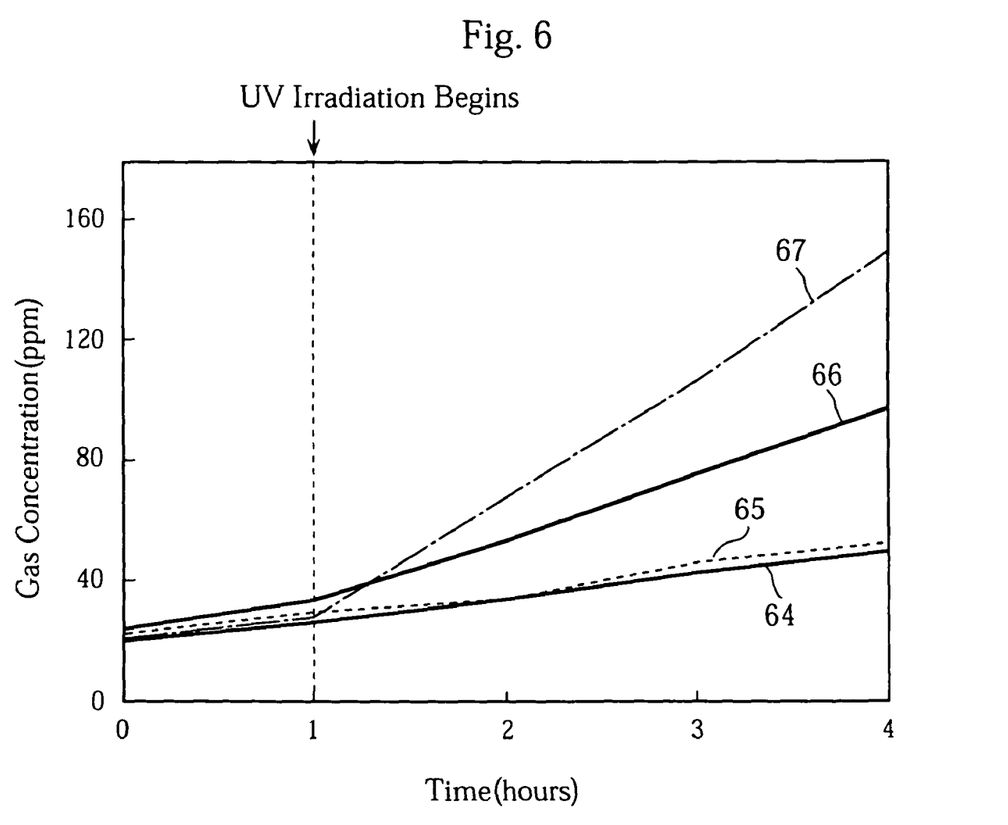
FIG. 6 is a graph of the results of measuring activity in Examples 4 to 7.

The photocatalytic activity of the photocatalytic apatite film formed above was examined. More specifically, photocatalytic activity was measured in the same manner as in Example 1, except that the initial acetaldehyde concentration was changed from approximately 4000 ppm to approximately 6000 ppm, and the UV irradiation dose was changed from 10 mW to 1 mW/cm². The measurement results are shown in the graph of FIG. 6. In the graph of FIG. 6, the vertical axis is the concentration of acetaldehyde remaining in the desiccator and of the carbon dioxide generated by the decomposition of this acetaldehyde, while the horizontal axis is elapsed time. In FIG. 6, line 64 is the change over time in the carbon dioxide concentration in this example.

EXAMPLES 5 TO 7

The photocatalytic apatite films of the various examples were formed in the same manner as in Example 4, except that the firing temperature in the firing performed after the sputtering step was changed from 500° C. to 530° C. (Example 5), 560° C. (Example 6), or 6000° C. (Example 7).

The photocatalytic activity of the photocatalytic apatite films of these examples was measured in the same manner as in Example 4. These results are shown in the graph of FIG. 6. In FIG. 6, lines 65, 66, and 67 are the change over time in the carbon dioxide concentration in Examples 5, 6, and 7, respectively.

COMPARATIVE EXAMPLE

Other than not performing the firing before the target production step or the firing after the sputtering step, the photocatalytic apatite film of this comparative example was formed in the same manner as in Example 1.

The photocatalytic activity of the photocatalytic apatite film of this comparative example was measured in the same manner as in Example 1. These results are shown in the graph of FIG. 5. In FIG. 5, line 54a is the change over time in the acetaldehyde concentration in this example, and line 54b is the change over time in the carbon dioxide concentration in this example.

EVALUATION

As shown by lines 54a and 54b in FIG. 5, the Ti—CaHAP film in the comparative example had poor photocatalytic capability to decompose acetaldehyde and generate carbon dioxide. The reason for this is believed to be that the collision of the ionized sputtering gas damaged the crystal structure of the Ti—CaHAP (the photocatalytic apatite constituting the target) to the extent that sufficient photocatalytic activity could not be maintained.

In contrast, as shown by lines 51a, 51b, 52a, 52b, 53a, and 53b in FIG. 5 and by lines 64, 65, 66, and 67 in FIG. 6, the Ti—CaHAP films in Examples 1 to 7 had high photocatalytic activity in an acetaldehyde decomposition reaction. This is because the crystallinity of the Ti—CaHAP was increased by the firing treatment performed before and/or after the sputtering step. The UV irradiation dose and the surface area of the photocatalytic apatite film subjected to activity measurement differed in Examples 1 to 3 from those in Examples 4 to 7, so the scales of the vertical axes in FIGS. 5 and 6 are different, but it can be seen from the graphs of both FIG. 5 and FIG. 6 that photocatalytic activity is suggested by the slope of the lines 51a, 52a, 53a, 64, 65, 66, and 67 expressing the change in carbon dioxide concentration.

In Example 2, the firing treatment is performed before the sputtering step, and the sputtering is performed by using a Ti—CaHAP target with high crystallinity. It is believed that in this sputtering step, the photocatalytic apatite is scattered from the target in a state of relatively large clusters that maintain their chemical structure enough to exhibit photocatalytic activity. In Examples 3 to 7, the firing treatment was performed after the sputtering step, and this resulted in an increase in the crystallinity of the Ti—CaHAP, which had decreased in the sputtering step. In Example 1, it is believed that the combined two firing treatments performed before and after sputtering contributed to the increase in crystallinity, resulting in the highest Ti—CaHAP crystallinity, and therefore the measured photocatalytic activity was higher than in the other examples.

Also, it can be seen from FIG. 6 that the increase in photocatalytic activity of the Ti—CaHAP film is relatively large when the firing temperature is about 550° C. or higher. This tells us that the heating temperature in a firing treatment aimed increasing crystallinity is preferably at least 550° C.

The invention claimed is:

1. A method for forming a photocatalytic apatite film, comprising:
    preparing powder of photocatalytic apatite by first preparing an aqueous solution containing a calcium supplier, a titanium supplier that provides titanium ions in the aqueous solution, a phosphate supplier and an alkali aqueous supplier to supply hydroxyl groups, subsequently causing the aqueous solution of the calcium supplier, the titanium supplier, the phosphate supplier and the hydroxyl groups to undergo co-precipitation for generating calcium hydroxyapatite wherein part of calcium is substituted with titanium, and then drying the generated titanium-substituted calcium hydroxyapatite to provide the powder of photocatalytic apatite, a proportion of titanium in combined calcium and titanium in the photocatalytic apatite is from 3 to 11 mol % as represented by an equation of Ti/(Ti+Ca) being from 0.03 to 0.11 molar ratio;
    producing a sputtering target by sintering the powder of photocatalytic apatite, and
    sputtering, using said sputtering target, to form a photocatalytic apatite film on a substrate, wherein the powder of photocatalytic apatite is fired at 500 to 900° C. to increase a crystallinity of the photocatalytic apatite before the producing of the sputtering target.

2. The method for forming a photocatalytic apatite film according to claim 1, wherein the firing fires the powder of photocatalytic apatite at 550° C. or higher.

3. The method for forming a photocatalytic apatite film according to claim 1, further comprising an additional firing of the photocatalytic apatite film formed on the substrate after the sputtering so as to increase the crystallinity of the photocatalytic apatite.

4. The method for forming a photocatalytic apatite film according to claim 3, wherein the additional firing fires the photocatalytic apatite at 550° C. or higher.

5. The method for forming a photocatalytic apatite film according to claim 1, wherein the producing of the sputtering target includes sintering the powder of photocatalytic apatite at 100 to 500° C.

6. The method for forming a photocatalytic apatite film according to claim 1, wherein the photocatalytic apatite film is formed at a gas pressure of 0.27 to 3 Pa and a substrate temperature of at least 100° C. in the sputtering.

7. The method for forming a photocatalytic apatite film according to claim 1, wherein argon gas is used as the sputtering gas in the sputtering.

* * * * *